US012748545B2

(12) United States Patent
Huang

(10) Patent No.: US 12,748,545 B2
(45) Date of Patent: Sep. 29, 2026

(54) METHODS AND DEVICES FOR DYNAMIC MANAGEMENT OF HOST PERFORMANCE BOOST REGIONS

(71) Applicant: Yangtze Memory Technologies Co., Ltd., Wuhan (CN)

(72) Inventor: Kai Huang, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/791,363

(22) Filed: Jul. 31, 2024

(65) Prior Publication Data

US 2025/0370653 A1 Dec. 4, 2025

(30) Foreign Application Priority Data

Jun. 4, 2024 (CN) ......................... 202410718657.5

(51) Int. Cl.
*G06F 3/06* (2006.01)

(52) U.S. Cl.
CPC .......... *G06F 3/0655* (2013.01); *G06F 3/0613* (2013.01); *G06F 3/0679* (2013.01)

(58) Field of Classification Search
CPC ..... G06F 3/0656; G06F 3/0679; G06F 3/0613
See application file for complete search history.

(56) References Cited

U.S. PATENT DOCUMENTS 11,194,736 B2 * 12/2021 Kang .................... G06F 12/122
11,693,781 B2 * 7/2023 Minopoli ............ G06F 12/0866 711/206
2016/0141026 A1 * 5/2016 Lee ........................ G11C 16/10 365/185.12
2020/0364157 A1 * 11/2020 Byun ...................... G06F 12/10
2020/0394139 A1 * 12/2020 Lee ......................... G06F 12/10
2021/0263852 A1 * 8/2021 Seok ................... G06F 12/0891
2022/0317905 A1 * 10/2022 Cao ....................... G06F 3/0679
2023/0229590 A1 * 7/2023 Bi ....................... G06F 12/0292 711/154
2023/0367706 A1 * 11/2023 Zhao ................... G06F 12/0246
2025/0044945 A1 * 2/2025 Jha ...................... G06F 12/0246
2025/0060904 A1 2/2025 Fu et al.

OTHER PUBLICATIONS

JEDEC Standard, "Universal Flash Storage (UFS) Host Performance Booster(HPB) Extension Version 2.0," JEDEC Solid State Technology Association, JESD220-3A, Apr. 20, 2020, 41 pages (Accepted Manuscript).

* cited by examiner

*Primary Examiner* — Mark A Giardino, Jr.
(74) *Attorney, Agent, or Firm* — Fish & Richardson P.C.

(57) ABSTRACT

The present disclosure relates to methods and devices for dynamic management of host performance boost (HPB) regions for memory systems. In one or more implementations of the present disclosure, an example host is provided. The host includes an interface and an interface driver. The interface is coupled to a memory system. The interface driver is configured to receive a read request from a file system to read data stored in a region associated with the memory system. The read request includes an active level of the region determined by the file system. The interface driver is further configured to determine whether the region is an HPB region to be activated based on the active level of the region.

20 Claims, 10 Drawing Sheets

METHODS AND DEVICES FOR DYNAMIC MANAGEMENT OF HOST PERFORMANCE BOOST REGIONS

CROSS-REFERENCE TO RELATED APPLICATIONS

This application claims priority to Chinese Patent Application No. 202410718657.5, filed on Jun. 4, 2024, which is hereby incorporated by reference in its entirety.

TECHNICAL FIELD

The present disclosure generally relates to semiconductor devices, and in particular, to methods and devices for controlling a memory system.

BACKGROUND

Semiconductor memory devices can be categorized into volatile memory devices and non-volatile memory devices. The volatile memory devices lose data when power is off. The non-volatile memory devices can retain stored data when power is not connected. Flash memory is a low-cost and high-density non-volatile memory device, which includes NOR flash memory and NAND flash memory. Various operations, such as read, program (write), and erase, can be performed by the flash memory.

SUMMARY

The present disclosure generally relates to semiconductor devices, and in particular, to methods and devices for dynamic management of host performance boost (HPB) regions in a memory system.

One aspect of the present disclosure features a host. The host includes: an interface coupled to a memory system; and an interface driver. The interface driver is configured to perform operations including receiving a read request from a file system to read data stored in a region associated with the memory system, where the read request includes an active level of the region, and where the active level of the region is determined by the file system; and determining whether the region is an HPB region to be activated based on at least the active level of the region.

In some implementations, determining whether the region is the HPB region to be activated based on at least the active level of the region includes: when the region is an active HPB region, determining that the region is not the HPB region to be activated; or when the region is an inactive HPB region, determining whether the region is the HPB region to be activated based on a read count of the region and an activation threshold, where the activation threshold is determined based on the active level of the region.

In some implementations, the determining whether the region is the HPB region to be activated based on the read count of the region and the activation threshold includes: increasing the read count by one in response to receiving the read request; and determining that the region is the HPB region to be activated when the increased read count is equal to the activation threshold.

In some implementations, the operations further include in response to determining that the region is the HPB region to be activated, sending an HPB request to the memory system through the interface for a portion of a logical-to-physical (L2P) mapping table, the portion of the L2P mapping table being associated with the region.

In some implementations, the activation threshold is smaller when the active level of the region is higher.

In some implementations, the operations further include: receiving an HPB response from the memory system through the interface, where the HPB response includes the portion of the L2P mapping table; storing the portion of the L2P mapping table in a memory of the host; and determining that the region is an active HPB region.

In some implementations, the interface driver is a Universal Flash Storage (UFS) host controller driver, the HPB request is a Host Performance Boost (HPB) read buffer command, and the HPB response is a data in UFS Protocol Information Units (UPIU) command.

In some implementations, the operations further include: in response to receiving the read request, sending a read command to the memory system through the interface, where the read command includes a portion of an L2P mapping table when the region is an active HPB region, the portion of the L2P mapping table being associated with the region.

In some implementations, the operations further include: in response to receiving the read request, sending a read command to the memory system through the interface, where the read command is absent of a portion of an L2P mapping table when region is an inactive HPB region.

In some implementations, the operations further include: detecting a no-access event of the region; and when the region is an active HPB region: increasing a no-access count of the region by one; and determining that the region is an inactive HPB region when the increased no-access count is equal to an inactivation threshold.

In some implementations, the no-access event is generated by the interface driver of the host in response to determining that the region is an active HPB region and that the host has not accessed the region within a predetermined time period.

In some implementations, the inactivation threshold is larger when the active level of the region is higher.

Another aspect of the present disclosure features an electrical system. The electrical system includes a memory system and a host. The memory system includes a memory controller and at least one memory device. The host includes: an interface coupled to the memory system; and an interface driver configured to: receive a read request from a file system to read data stored in a region associated with the memory system, where the read request includes an active level of the region, and where the active level of the region is determined by the file system; and determine whether the region is an HPB region to be activated based on at least the active level of the region.

In some implementations, whether the region is the HPB region to be activated is determined by: when the region is an active HPB region, determining that the region is not the HPB region to be activated; or when the region is an inactive HPB region: increasing a read count of the region by one; determining an activation threshold based on the active level of the region; and determining that the region is the HPB region to be activated when the increased read count is equal to the activation threshold.

In some implementations, the interface driver is further configured to: in response to determining that the region is the HPB region to be activated, send an HPB request to the memory system through the interface for a portion of an L2P mapping table, the portion of the L2P mapping table being associated with the region.

In some implementations, the memory controller is configured to: receive the HPB request from the host; determine a portion of an L2P mapping table, where the portion of the L2P mapping table is associated with the region; and send an HPB response to the host, where the HPB response includes the portion of the L2P mapping table.

In some implementations, the interface driver is further configured to: in response to receiving the read request, send a read command to the memory system through the interface, where the read command includes a portion of an L2P mapping table when the region is an active HPB region, the portion of the L2P mapping table being associated with the region.

In some implementations, the interface driver is further configured to: in response to receiving the read request, send a read command to the memory system through the interface, where the read command is absent of a portion of an L2P mapping table when the region is an inactive HPB region.

In some implementations, the memory controller is configured to: receive a read command from the host through the interface; and determine whether the read command is associated with data in an active HPB region and whether the read command includes a portion of an L2P mapping table associated with the active HPB region.

In some implementations, the memory controller is further configured to: in response to determining that the read command is associated with the data in the active HPB region and that the read command includes the portion of the L2P mapping table associated with the active HPB region: determine physical addresses of the data based on the portion of the L2P mapping table in the read command; and perform read operations based on the physical addresses.

In some implementations, the memory controller is further configured to: in response to determining at least one of: the read command is not associated with the data in the active HPB region or the read command is absent of the portion of the L2P mapping table associated with the active HPB region: determine physical addresses of the data based on an L2P mapping table stored in the memory system; and perform read operations based on the physical addresses.

Another aspect of the present disclosure features a method. The method includes receiving, by an interface driver of a host, a read request from a file system to read data stored in a region associated with a memory system, where the read request includes an active level of the region, and where the active level of the region is determined by the file system; and determining, by the interface driver, whether the region is an HPB region to be activated based on at least the active level of the region.

In some implementations, determining whether the region is the HPB region to be activated based on at least the active level of the region includes: when the region is an active HPB region, determining that the region is not the HPB region to be activated; or when the region is an inactive HPB region, determining whether the region is the HPB region to be activated based on a read count of the region and an activation threshold, where the activation threshold is determined based on the active level of the region.

In some implementations, determining whether the region is the HPB region to be activated based on the read count of the region and the activation threshold includes: increasing the read count by one; and determining that the region is the HPB region to be activated when the increased read count is equal to the activation threshold.

Another aspect of the present disclosure features a non-transitory computer readable medium. The non-transitory computer readable medium stores programming instructions for execution by at least one processor of a device to cause the device to perform operations including: receiving, by an interface driver of the device, a read request from a file system to read data stored in a region associated with a memory system, where the read request includes an active level of the region, and where the active level of the region is determined by the file system; and determining, by the interface driver, whether the region is an HPB region to be activated based on at least the active level of the region.

The details of one or more implementations of the subject matter of this present disclosure are set forth in the accompanying drawings and the description below. Other features, aspects, and advantages of the subject matter will become apparent from the description, the drawings, and the claims.

BRIEF DESCRIPTION OF DRAWINGS

Like reference numbers and designations in the various drawings indicate like elements. It is also to be understood that the various exemplary implementations shown in the figures are merely illustrative representations and are not necessarily drawn to scale.

DETAILED DESCRIPTION

In one or more implementations of the present disclosure, an example host is provided. The host includes an interface and an interface driver. The interface is coupled to a memory system. The interface driver is configured to receive a read request from a file system to read data stored in a region associated with the memory system. The read request includes an active level of the region determined by the file system. The interface driver is further configured to determine whether the region is a Host Performance Boost (HPB) region to be activated based on the active level of the region.

Implementations of the present disclosure can provide one or more of the following technical advantages and/or benefits. First, the techniques described in the present disclosure allow the host to use a host memory as a cache to store a logical-to-physical (L2P) address mapping table and to include the L2P table in a memory access request. The memory system can obtain physical addresses of requested data based on the L2P table in the memory access request without accessing the L2P table stored in the memory system, thereby avoiding delay and improving the data access performance. In addition, the host and the memory system both can recommend a new HPB region, and the HPB region recommendation can be based on data temperature information or an active level of a region provided by the file system. As such, the techniques provide more flexibility to HPB region management and improve efficiency in memory data access.

The techniques can be applied to various types of semiconductor devices, volatile memory devices, such as DRAM memory devices, or non-volatile memory (NVM) devices, such as NAND flash memory, NOR flash memory, resistive random-access memory (RRAM), phase-change memory (PCM) such as phase-change random-access memory (PCRAM), spin-transfer torque (STT)-Magnetoresistive random-access memory (MRAM), among others. The techniques can also be applied to charge-trapping based memory devices, e.g., silicon-oxide-nitride-oxide-silicon (SONOS) memory devices, and floating-gate based memory devices. The techniques can be applied to three-dimensional (3D) memory devices. The techniques can be applied to various memory types, such as SLC (single-level cell) devices, MLC (multi-level cell) devices like 2-level cell devices, TLC (triple-level cell) devices, QLC (quad-level cell) devices, or PLC (penta-level cell) devices. Additionally or alternatively, the techniques can be applied to various types of devices and systems, such as secure digital (SD) cards, embedded multimedia cards (eMMC), or solid-state drives (SSDs), embedded systems, among others.

Figure 1A:
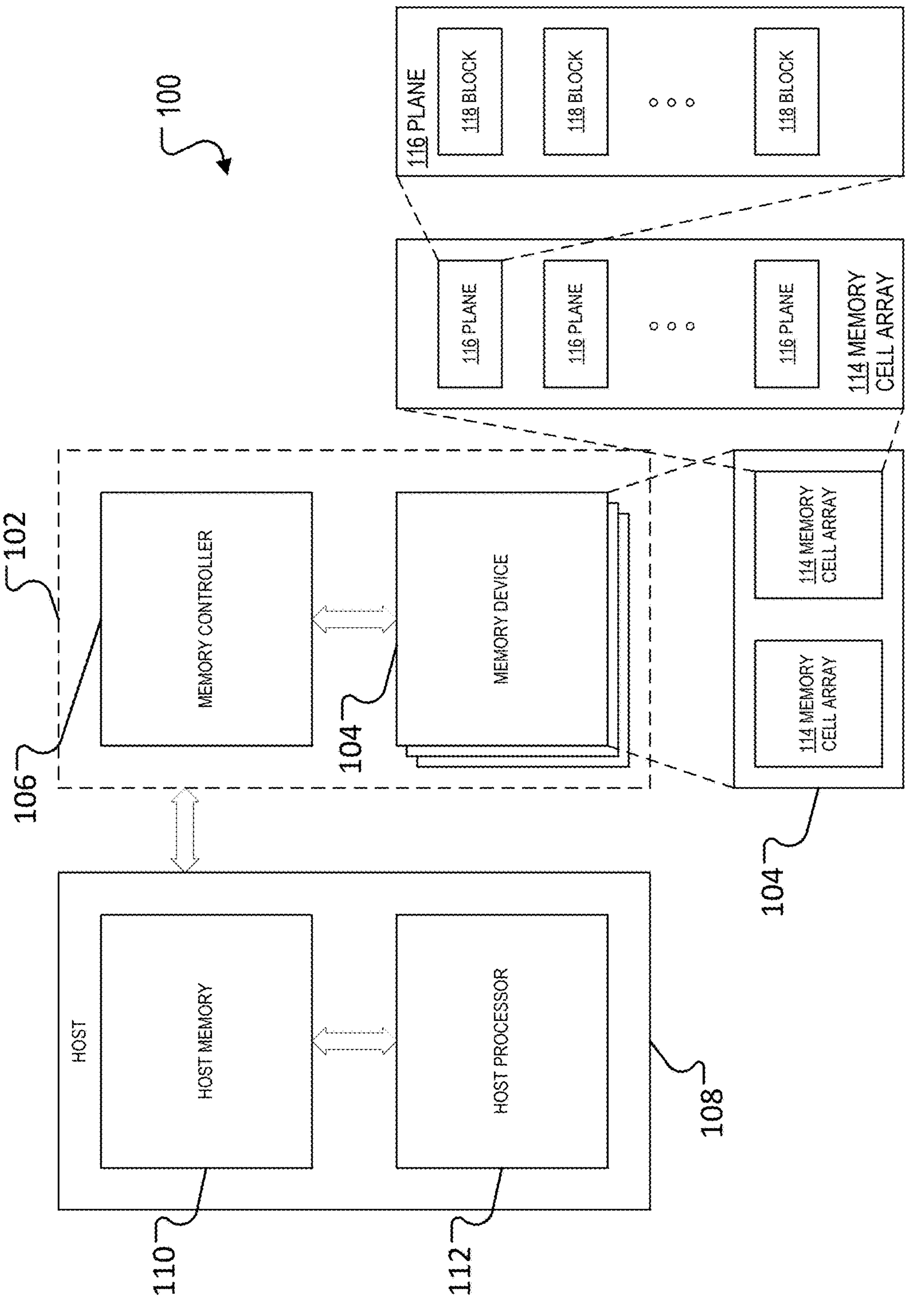
FIGS. 1A-1B illustrate block diagrams of an example system.

FIG. 1A illustrates a block diagram of an example system 100 having a memory device, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an augmented reality (AR) device, or any other suitable electronic devices having storage therein. As shown in FIG. 1A, system 100 can include a host 108 having a host memory 110 and a host processor 112, and a memory system 102 having one or more memory devices 104 and a memory controller 106.

Host 108 can be a processor of an electronic device, such as a central processing unit (CPU), or a system-on-chip (SoC), such as an application processor (AP). Host 108 can be coupled to memory controller 106 and configured to send or receive data to or from memory devices 104 through memory controller 106. For example, host 108 may send the program data in a program operation or receive the read data in a read operation. Host processor 112 can be a control unit (CU), or an arithmetic & logic unit (ALU). Host memory 110 can be memory units including register or cache memory. Host 108 is configured to receive and transmit instructions and commands from and to memory controller 106 of memory system 102, and execute or perform multiple functions and operations provided in the present disclosure, which will be described later.

Memory device 104 can be any memory device disclosed in the present disclosure, such as a NAND Flash memory device. It is noted that the NAND Flash is only one example of a memory device for illustrative purposes. It can include any suitable solid-state, non-volatile memory, e.g., NOR Flash, Ferroelectric RAM (FeRAM), Phase-change memory (PCM), Magnetoresistive random-access memory (MRAM), Spin-transfer torque magnetic random-access memory (STT-RAM), or Resistive random-access memory (RRAM), etc. In some implementations, memory device 104 includes a three-dimensional (3D) NAND Flash memory device.

As shown in FIG. 1A, memory device 104 may include one or more dies. A die may include a memory cell array 114 and a peripheral circuit (not shown in FIG. 1A). The memory cell array 114 may include multiple planes 116. Each plane 116 may include multiple physical blocks 118.

Memory controller 106 can be implemented by microprocessors, microcontrollers (a.k.a. microcontroller units (MCUs)), digital signal processors (DSPs), application-specific integrated circuits (ASICs), field-programmable gate arrays (FPGAs), programmable logic devices (PLDs), state machines, gated logic, discrete hardware circuits, and other suitable hardware, firmware, and/or software configured to perform the various functions described below in detail.

Memory controller 106 is coupled to memory device 104 and host 108 and is configured to control memory device 104, according to some implementations. Memory controller 106 can manage the data stored in memory device 104 and communicate with host 108. In some implementations, memory controller 106 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 106 is designed for operating in a high duty-cycle environment solid state drives (SSDs) or embedded multi-media-cards (eMMCs) used as data storage for mobile devices, such as smartphones, tablets, laptop computers, etc., and enterprise storage arrays. Memory controller 106 can be configured to control operations of memory device 104, such as read, erase, and program operations, by providing instructions, such as read instructions, to memory device 104. For example, memory controller 106 may be configured to provide a read instruction to a peripheral circuit of memory device 104 to control the read operation. Memory controller 106 can also be configured to manage various functions with respect to the data stored or to be stored in memory device 104 including, but not limited to bad-block management, garbage collection, logical-to-physical address conversion, wear leveling, etc. In some implementations, memory controller 106 is further configured to process error correction codes (ECCs) with respect to the data read from or written to memory device 104. Any other suitable functions may be performed by memory controller 106 as well, for example, formatting memory device 104.

Memory controller 106 can communicate with an external device (e.g., host 108) according to a particular communication protocol. For example, memory controller 106 may communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc. Memory controller 106 is configured to receive and transmit a command to and from host 108, and execute or perform multiple functions and operations provided in the present disclosure, which will be described later.

Figure 1B:
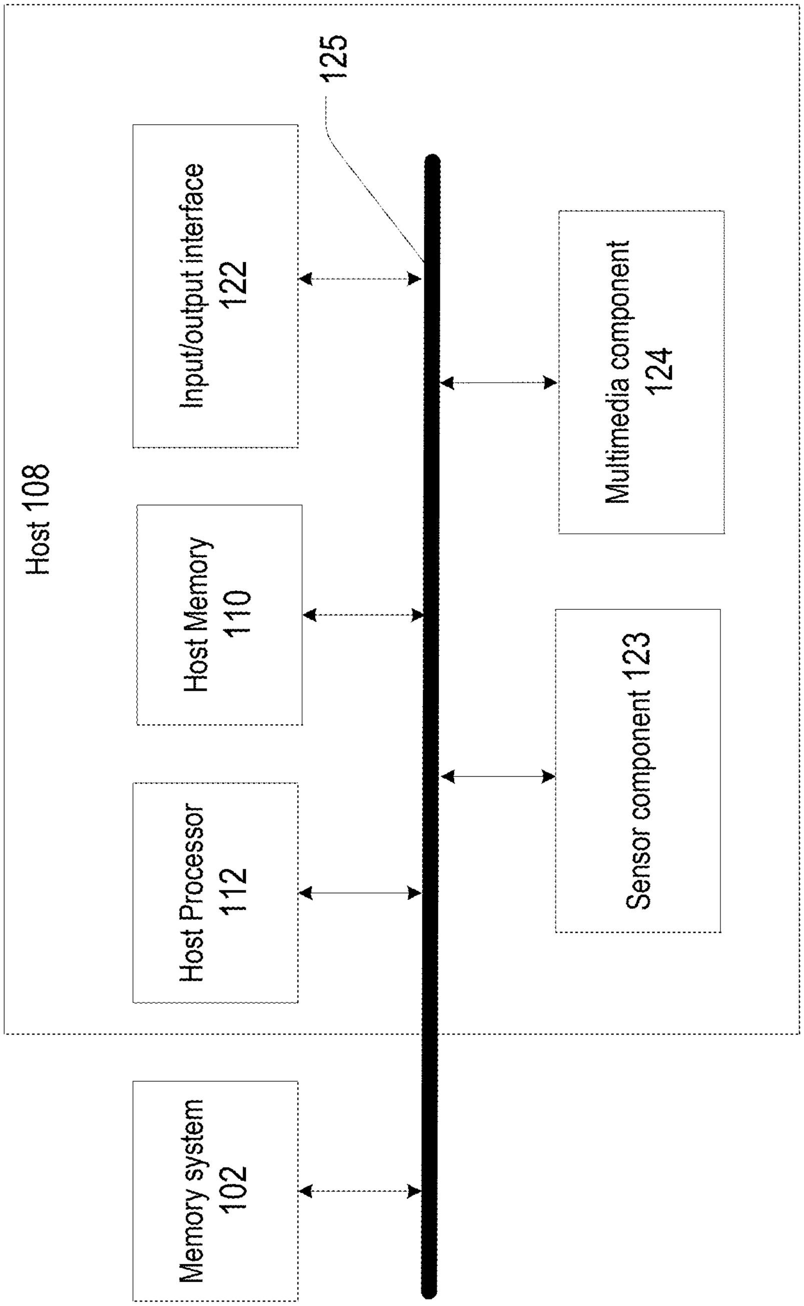

FIG. 1B is a schematic diagram of an example host (e.g., the host 108 of FIG. 1A). The host 108 may include: the host memory 110, the host processor 112, an input/output interface 122, a sensor component 123, and a multimedia component 124, etc. The host memory 110, the host processor 112, the input/output interface 122, the sensor component 123, and multimedia component 124 may be coupled respectively through a bus 125. In some implementations, as shown in FIG. 1B, the memory system 102 also can be coupled to the host 108 through the bus 125.

The host processor 112 can be a control center of an electrical system (e.g., the system 100 of FIG. 1A), which connects one or more parts of the system using various interfaces and wires, and executes various functions of and processes data of the system by running or executing software programs and/or software modules stored in the memory and calling data stored in the memory, thereby performing overall monitoring on the system. In some feasible examples, the host processor 112 may be a single processor structure, a multiple processors structure, a single-thread processor or a multi-thread processor, etc. In some feasible examples, the host processor 112 may include at least one of a central processor unit, a general-purpose processor, a digital signal processor, a neural network processor, a graphics processing unit (GPU), an image signal processor, a microcontroller or microprocessor, etc. In addition, the host processor 112 may further include other hardware circuits or accelerators, such as an application-specific integrated circuit, a field programmable gate array, or other programmable logic devices, transistor logic devices, hardware components, or any combination thereof. The host processor 112 can implement or execute various example logical blocks, modules, and circuits described in conjunction with the disclosure of the present application. The host processor 112 may also include a combination that achieves a computing function, such as a combination including one or more microprocessors, or a combination of a digital signal processor and a microprocessor, etc.

The sensor component 123 includes one or more sensors used for providing state evaluation in various aspects of the system. The sensor component 123 may include an optical sensor, an acceleration sensor, a gyroscope sensor, a magnetic sensor, a pressure sensor, or a temperature sensor. A surrounding image, acceleration/deceleration, an orientation, or an on/off state of the system, relative positioning of the component, or a temperature variation of the system may be detected by the sensor component 123.

The multimedia component 124 provides a screen with an output interface between the system and a user. When the screen is a touch panel, the screen may be implemented as a touch screen to receive an input signal from the user. The touch panel includes one or more touch sensors to sense a touch, a slide, and a gesture on the touch panel. The touch sensor can not only sense a boundary of a touch or slide action, but also detect duration and pressure associated with a touch or slide operation.

The input/output interface 122 provides an interface between the host processor 112 and a peripheral interface module which, for example, may include a keyboard, a mouse, or a universal serial bus (USB) apparatus, etc. In a possible implementation, there may be only one or more input/output interfaces 122.

Figure 2A:
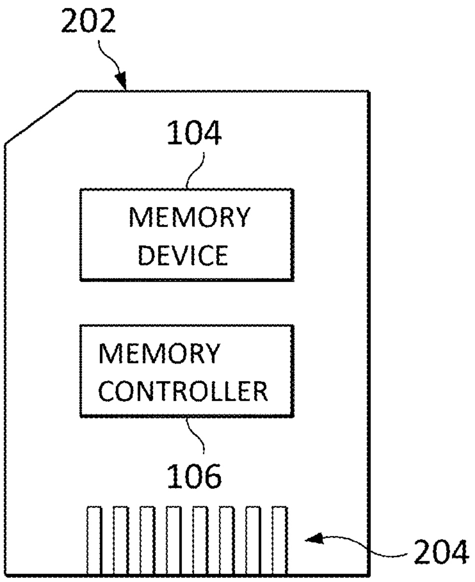
FIGS. 2A-2B illustrate example memory products.
Figure 2B:
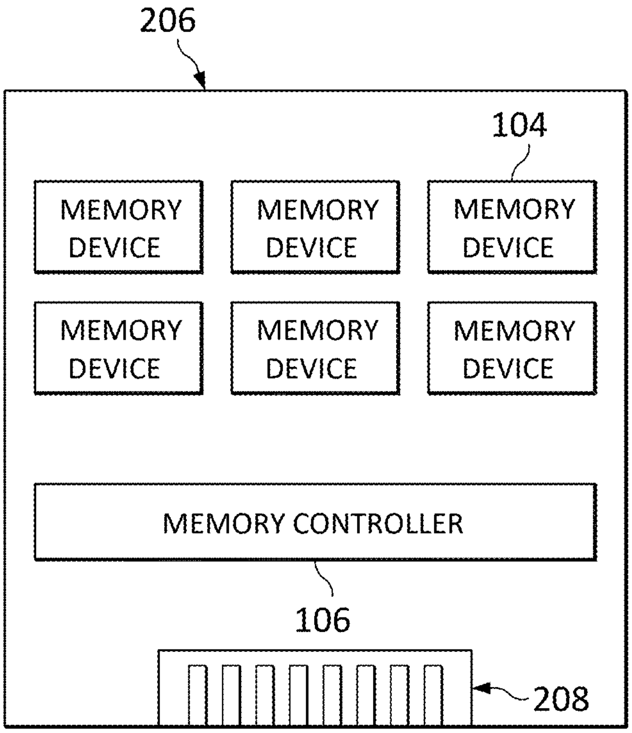

Memory controller 106 and one or more memory devices 104 can be integrated into various types of storage devices, for example, being included in the same package, such as a universal Flash storage (UFS) package or an eMMC package. That is, memory system 102 can be implemented and packaged into different types of end electronic products. In one example as shown in FIG. 2A, memory controller 106 and a single memory device 104 may be integrated into a memory card 202. Memory card 202 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 202 can further include a memory card connector 204 coupling memory card 202 with a host (e.g., host 108 in FIG. 1A). In another example as shown in FIG. 2B, memory controller 106 and multiple memory devices 104 may be integrated into an SSD 206. SSD 206 can further include an SSD connector 208 coupling SSD 206 with a host (e.g., host 108 in FIG. 1A). In some implementations, the storage capacity and/or the operation speed of SSD 206 is greater than those of memory card 202.

Figure 3:
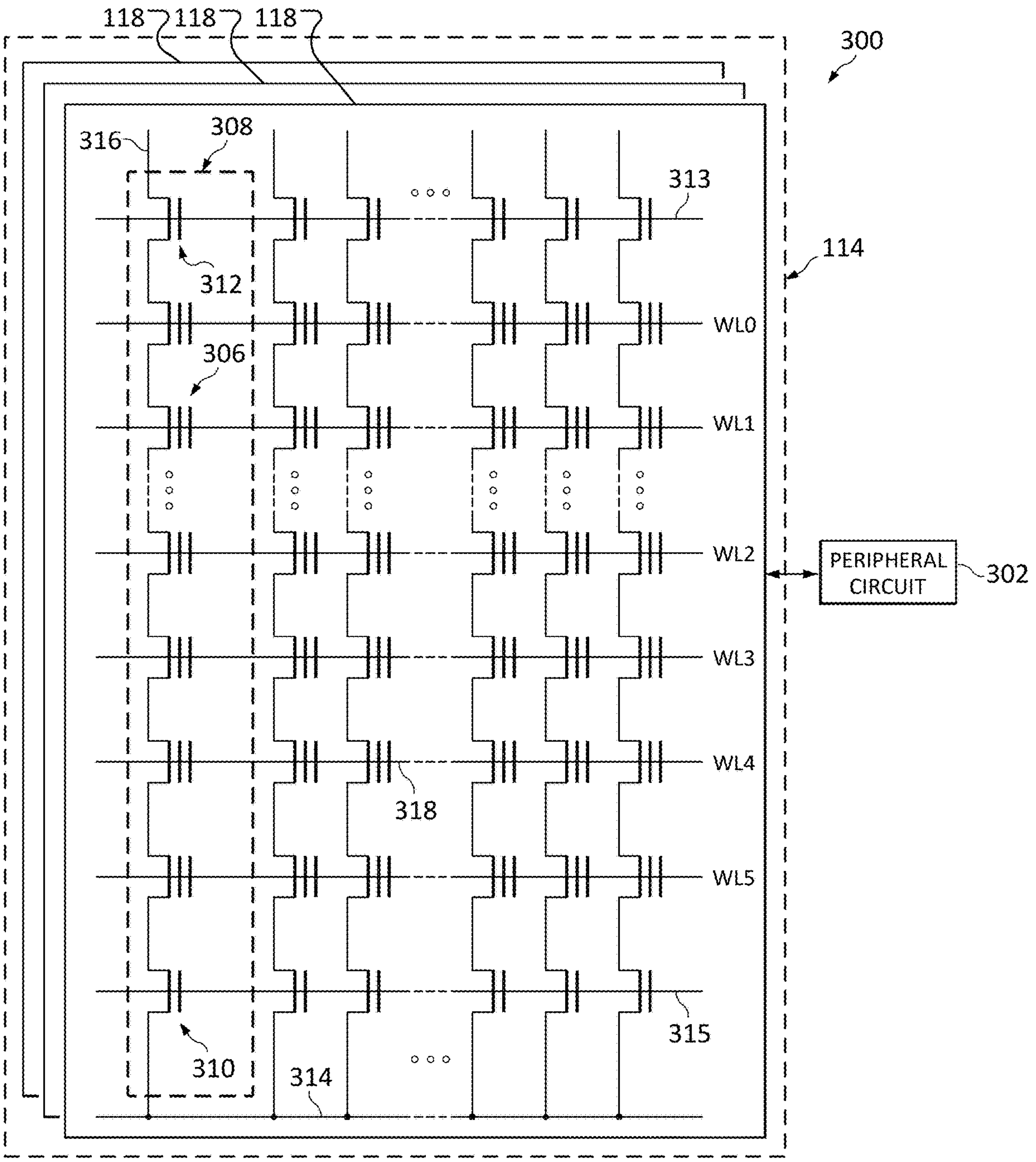
FIG. 3 illustrates a schematic circuit diagram of an example memory device including peripheral circuits.

FIG. 3 illustrates a schematic circuit diagram of an example memory device 300 including peripheral circuits, according to some aspects of the present disclosure. Memory device 300 can be an example of memory device 104 in FIG. 1A. It is noted that the NAND Flash disclosed herein is only one example of a memory device for illustrative purposes. It can include any suitable solid-state, non-volatile memory, e.g., NOR Flash, FeRAM, PCM, MRAM, STT-RAM, or RRAM, etc. Memory device 300 can include a memory cell array 114 and peripheral circuits 302 coupled to memory cell array 114. Memory cell array 114 can be a NAND Flash memory cell array in which memory cells 306 are provided in the form of an array of NAND memory strings 308 each extending vertically above a substrate (not shown). In some implementations, each NAND memory string 308 includes a plurality of memory cells 306 coupled in series and stacked vertically. Each memory cell 306 can hold a continuous, analog value, such as an electrical voltage or charge, which depends on the number of electrons trapped within a region of memory cell 306. Each memory cell 306 can be either a floating gate type of memory cell including a floating-gate transistor or a charge trap type of memory cell including a charge-trap transistor.

In some implementations, each memory cell 306 is a single-level cell (SLC) that has two possible memory states and thus, can store one bit of data. For example, the first memory state “0” can correspond to a first range of voltages, and the second memory state “1” can correspond to a second range of voltages. In some implementations, each memory cell 306 is a multi-level cell (MLC) that is capable of storing more than a single bit of data in more than four memory states. For example, the MLC can store two bits per cell, three bits per cell (also known as triple-level cell (TLC)), or four bits per cell (also known as a quad-level cell (QLC)). Each MLC can be programmed to assume a range of possible nominal storage values. In one example, if each MLC stores two bits of data, then the MLC can be programmed to assume one of three possible programming levels from an erased state by writing one of three possible nominal storage values to the cell. A fourth nominal storage value can be used for the erased state.

As shown in FIG. 3, each NAND memory string 308 can include a source select gate (SSG) transistor 310 at its source end and a drain select gate (DSG) transistor 312 at its drain end. SSG transistor 310 and DSG transistor 312 can be configured to activate selected NAND memory strings 308 (columns of the array) during read and program operations. In some implementations, the sources of NAND memory strings 308 in the same physical block 118 are coupled through a same source line (SL) 314, e.g., a common SL. In other words, NAND memory strings 308 in the same physical block 118 have an array common source (ACS), according to some implementations. The drain of DSG transistor 312 of each NAND memory string 308 is coupled to a respective bit line 316 from which data can be read or written via an output bus (not shown), according to some implementations. In some implementations, each NAND memory string 308 is configured to be selected or deselected by applying a select voltage (e.g., above the threshold voltage of DSG transistor 312) or a deselect voltage (e.g., 0 V) to the gate of respective DSG transistor 312 through one or more DSG lines 313 and/or by applying a select voltage (e.g., above the threshold voltage of SSG transistor 310) or a deselect voltage (e.g., 0 V) to the gate of respective SSG transistor 310 through one or more SSG lines 315.

As shown in FIG. 3, NAND memory strings 308 can be organized into multiple physical blocks 118, each of which can have a common source line 314, e.g., coupled to the ACS. In some implementations, each physical block 118 is the basic data unit for erase operations, i.e., memory cells 306 on the same physical block 118 are erased at the same time. To erase memory cells 306 in a selected physical block 118, source lines 314 coupled to selected physical block 118 as well as unselected physical blocks 118 in the same plane as selected physical block 118 can be biased with an erase voltage (Vers), such as a high positive voltage (e.g., 20 V or more). Memory cells 306 of adjacent NAND memory strings 308 can be coupled through word lines 318 that select which row of memory cells 306 is affected by the read and program operations. Peripheral circuits 302 can be coupled to memory cell array 114 through bit lines 316, word lines 318, source lines 314, SSG lines 315, and DSG lines 313. Peripheral circuits 302 can include any suitable analog, digital, and mixed-signal circuits for facilitating the operations of memory cell array 114 by applying and sensing voltage signals and/or current signals to and from each target memory cell 306 through bit lines 316, word lines 318, source lines 314, SSG lines 315, and DSG lines 313. Peripheral circuits 302 can include various types of peripheral circuits formed using metal-oxide-semiconductor (MOS) technologies.

Figure 4:
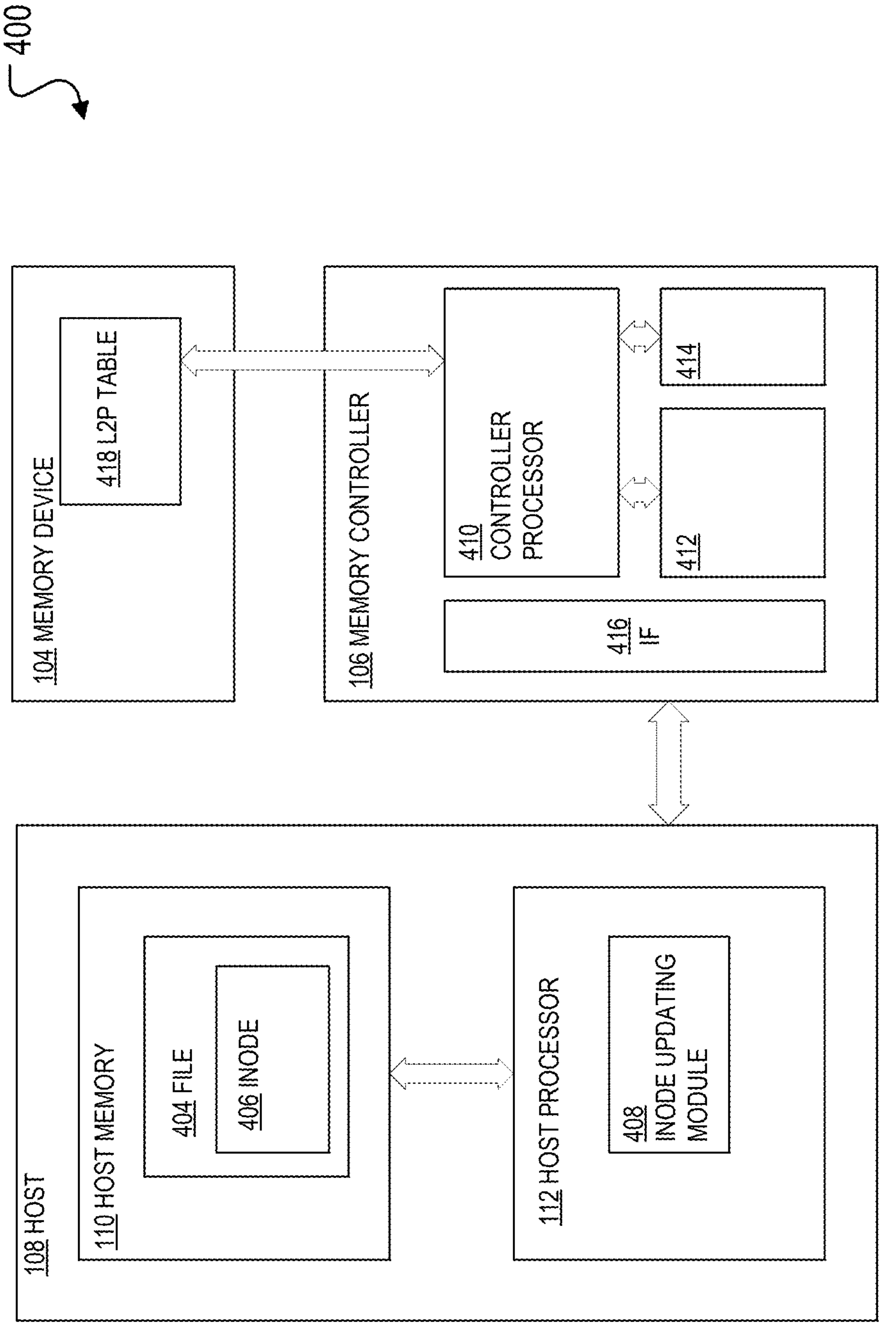
FIG. 4 illustrates another block diagram of an example system.

FIG. 4 illustrates a block diagram of an example system 400 including a memory device 104, a memory controller 106, and a host 108, according to some aspects of the present disclosure. In some implementations, memory device 104 is a NAND device. As shown in FIG. 4, host 108 may include a host memory 110 and a host processor 112. Host memory 110 may store logical addresses, e.g., a logical block address (LBA) of files (e.g., file 404), and an index node 406 (e.g., inode) of the files. Host processor 112 may include or be coupled to an index node updating module 408 (e.g., inode updating module). Index node updating module 408 is configured to update index node 406 of the files. It is noted that the index node (e.g., inode) may be a data structure in a Unix-style file system that describes a file-system object such as a file or a directory. It can be a file data structure that stores information about any Linux file except its name and data. It stores metadata of the file including the file size, the device on which the file is stored, user and group IDs associated with the file, or permissions needed to access the file.

As shown in FIG. 4, memory controller 106 can include a controller processor 410, such as a memory chip controller (MCC) or a memory controller unit (MCU). Controller processor 410 is configured to control modules to execute commands or instructions to perform functions disclosed in the present disclosure. Controller processor 410 can also be configured to control the operations of each peripheral circuit by generating and sending various control signals, such as read commands for read operations. Controller processor 410 can also send clock signals at desired frequencies, periods, and duty cycles to other peripheral circuits 302 to orchestrate the operations of each peripheral circuit 302, for example, for synchronization.

Memory controller 106 can further include at least one of a volatile controller memory 412 and a non-volatile controller memory 414. In some implementations, memory controller 105 may include both volatile controller memory 412 and non-volatile controller memory 414. In some implementations, memory controller 105 may include either volatile controller memory 412 or non-volatile controller memory 414. Volatile controller memory 412 can include a register or cache memory such that it allows a faster access and process speed to read, write, or erase the data stored therein, while it may not retain stored information after power is removed. In some implementations, volatile controller memory 412 includes either dynamic random-access memory (DRAM) or static random-access memory (SRAM). Non-volatile controller memory 414 can retain the stored information even after power is removed. In some implementations, non-volatile controller memory 414 includes NAND, NOR, FeRAM, PCM, MRAM, STT-RAM, or RRAM. In some implementations, non-volatile controller memory 414 may not be provided in the memory controller 106. For example, non-volatile controller memory 414 is deposed outside of the memory controller 106 but is coupled to the memory controller 106.

As shown in FIG. 4, memory controller 106 can include a memory controller interface 416 configured to receive and transmit commands or instructions from and to host 108. In some implementations, memory controller interface 416 is coupled to the controller processor 410 and is configured to receive and transmit commands or instructions that cause controller processor 410 to perform functions disclosed in the present disclosure.

Logical-to-physical (L2P) address mapping tables may be stored in various locations of the system 400. In some implementations, a L2P address mapping table can also be referred to as a L2P mapping table or a L2P table. A L2P address mapping table 418 may be stored in a non-volatile memory such as memory device 104 (e.g., a NAND device) and non-volatile controller memory 414. This way, address mapping data in the L2P address mapping table 418 will not be erased after power off. In some implementations, a L2P address mapping table is stored and processed in a volatile memory such as volatile controller memory 412. In some implementations, after the system boots up or restarts, a L2P address mapping table can be loaded from memory device 104 or non-volatile controller memory 414 and stored in volatile controller memory 412 for faster access and processing speed on a regular basis. In some implementations, L2P address mapping table 418 may include address mapping data corresponding to file 404 in host memory 110.

Memory controller 106 may include an address mapping table updating module (not shown in FIG. 4) configured to generate and update L2P address mapping table 418. The address mapping table updating module may be implemented through a firmware program in the firmware of controller processor 410. In some implementations, the address mapping table updating module is in controller processor 410 or coupled to controller processor 410, and may be controlled by controller processor 410 to execute commands and instructions from host 108. For instance, the address mapping table updating module is configured to execute a mapping update command received from host 108 and update L2P address mapping table 418 accordingly.

In some implementations, to improve the read performance, the L2P table 418 or at least a portion of the L2P table 418 can be stored in the host memory 110. For example, the memory system 102 can be a Universal Flash Storage (UFS) device. The UFS device can support a Host Performance Boost (HPB) feature, which allows the host 108 to store the L2P table 418 or at least a portion of the L2P table 418 in the host memory 110. The L2P table 418 or at least a portion of the L2P table 418 in the host memory 110 can correspond to one or more regions. A region can be a logical storage space that maps to one or more physical blocks in the memory device 104 of the memory system 102. In some implementations, the region can include logical blocks with consecutive LBAs. In this example, a region whose L2P table is stored in the host memory 110 can be referred to as an HPB region. When the host 108 requests data in an HPB region, the host 108 can send a read command to the UFS device. The read command can include the L2P table (or a portion of an L2P table) corresponding to the HPB region. In some implementations, the data requested by the host 108 may be stored in a portion of the HPB region, or in multiple HPB regions including the above-mentioned HPB region. The read command can include a portion of the L2P table corresponding to the data requested by the host 108. The portion of the L2P table can be referred to as an L2P entry or an HPB entry, which can include LBAs and PBAs of the data requested by the host 108. When receiving the read command, the UFS device can directly apply the L2P table (or the L2P entry) in the read command without spending time to obtain an L2P table from the memory controller 106 (e.g., the volatile controller memory 412 or the non-volatile controller memory 414 as shown in FIG. 4) or the memory device 104, thereby improving data read efficiency. While in the present disclosure, some implementations are described in the context of a UFS device with a HPB feature, it is understood that these implementations are merely examples for illustration purpose and are not intended to be construed in a limiting sense. The techniques described in the present disclosure can be applicable to any suitable storage systems. For example, the techniques can be applied to an SSD that supports a Host Memory Buffer (HMB) feature.

Figure 5:
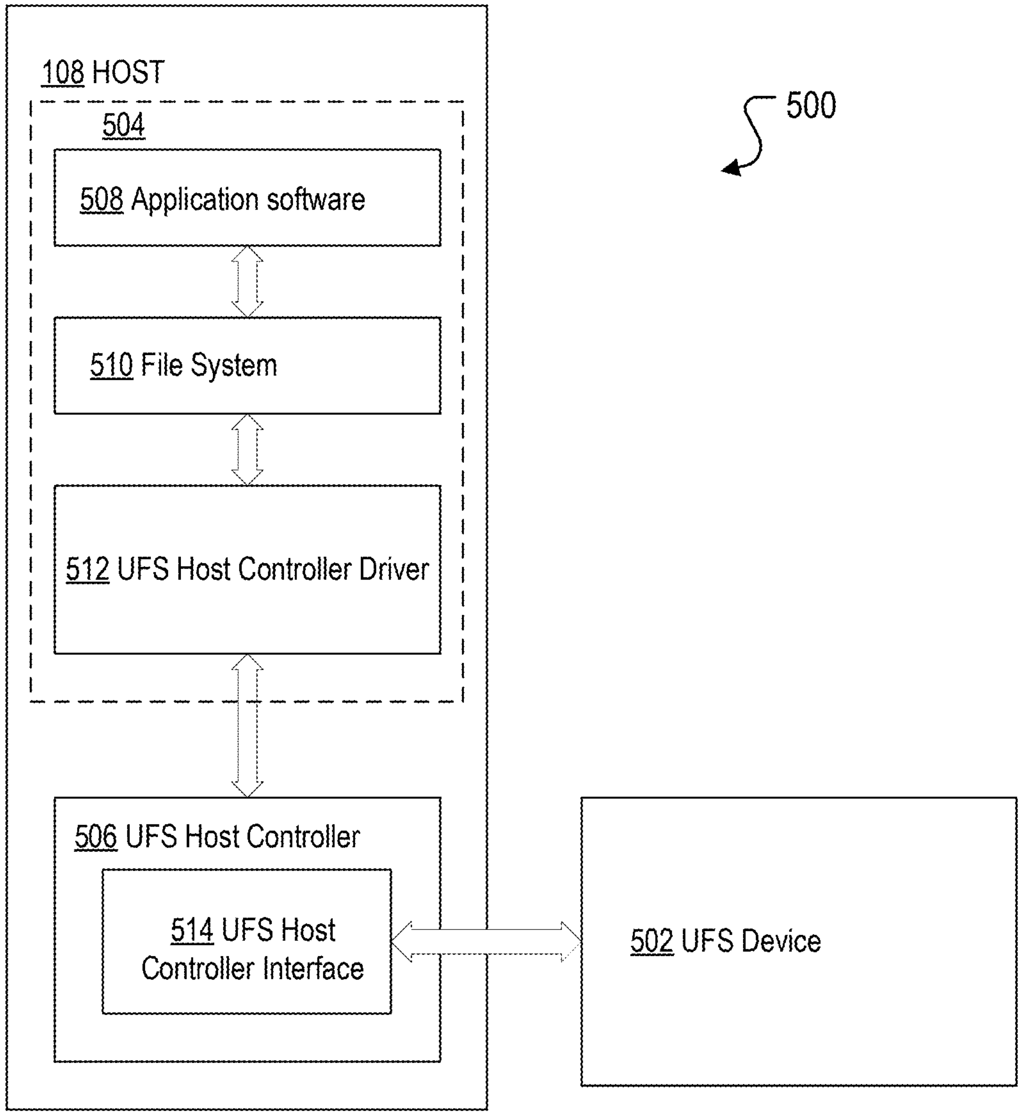
FIG. 5 illustrates a block diagram of an example host coupled to an example Universal Flash Storage (UFS) device.

FIG. 5 illustrates a block diagram 500 of an example host 108 coupled to a UFS device 502. The host 108 and the UFS device 502 can communicate with each other according to a UFS protocol. In some implementations, the host 108 can include a software module 504 and a UFS host controller 506. The software module 504 can include application software 508, a file system 510, and a UFS host controller driver 512. The application software 508 can be various application programs executed in the host 108. When the application software 508 accesses data in the UFS device 502, the application software 508 can send data access commands to the UFS host controller driver 512 through the file system 510. In some implementations, the file system 510 can be a flash friendly file system (F2FS). The UFS host controller driver 512 can be configured to manage the UFS host controller 506 to perform data management operations (e.g., data write and read operations) on the UFS device 502. The application software 508, the file system 510, and the UFS host controller driver 512 can be loaded to a memory (e.g., the host memory 110 of FIG. 1) of the host 108 and can be executed by a processor (e.g., the host processor 112 of FIG. 1) of the host 108. In some implementations, the UFS host controller 506 can include a UFS host controller interface 514. The UFS host controller interface 514 can communicate with an interface of the UFS device 502, such as the memory controller interface 416 of FIG. 4. In some implementations, the UFS host controller driver 512 can communicate with the UFS device 502 through the UFS host controller interface 514. For example, the UFS host controller 506 can receive a data access request from the UFS host controller driver 512 and transmit the request to the UFS device 502 through the UFS host controller interface 514. The UFS host controller 506 can also transmit a data access result from the UFS host controller interface 514 to the UFS host controller driver 512.

Figure 6:
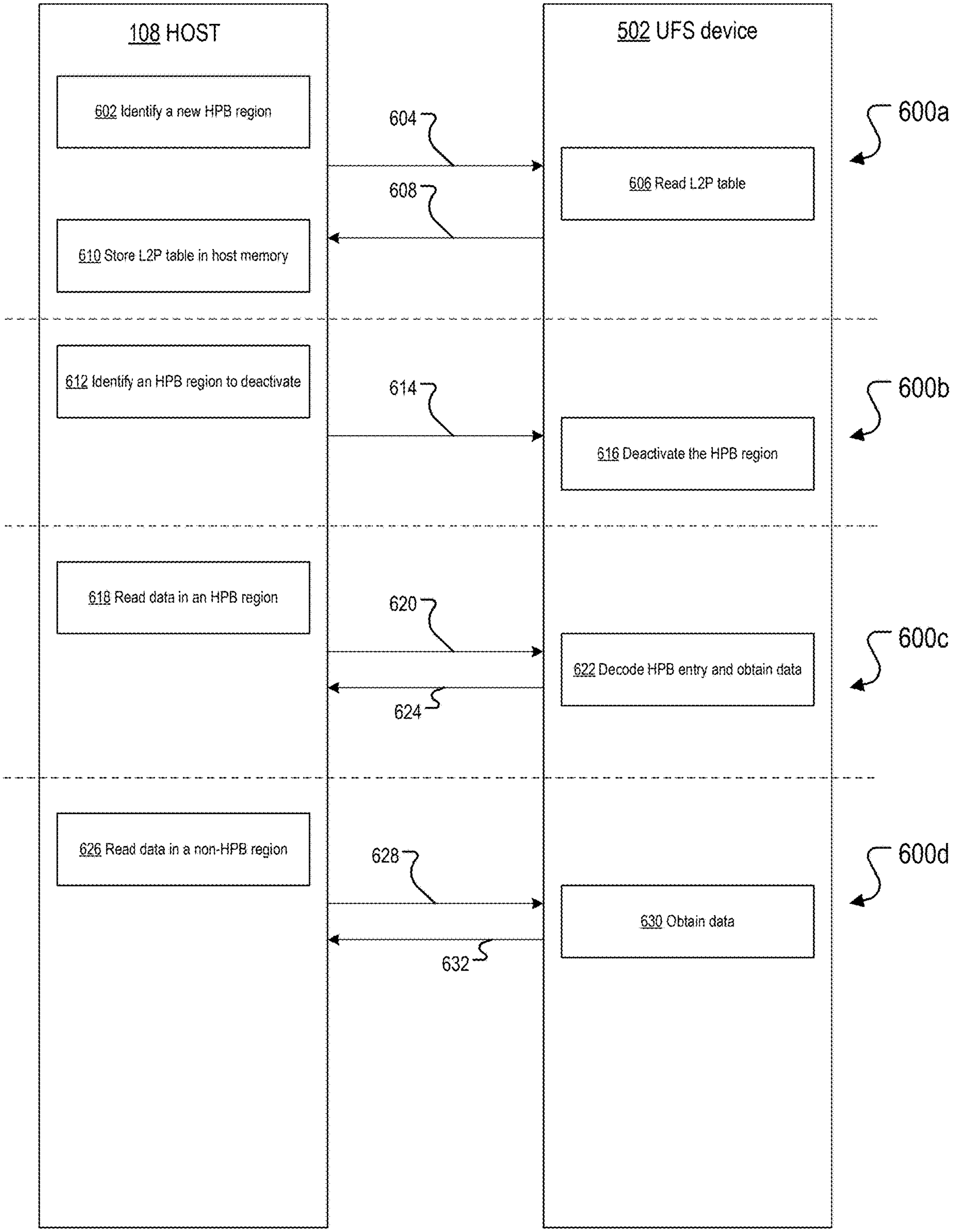
FIG. 6 illustrates example Host Performance Boost (HPB) and non-HPB operations.

FIG. 6 illustrates example HPB and non-HPB operations. In some implementations, the non-HPB operations can be referred to as normal operations. Diagram 600*a* shows an HPB region activation (also referred to as an HPB region recommendation) process. The host 108 (e.g., using the UFS host controller driver 512) can identify a region to be activated as a new HPB region (operation 602) and send a request (operation 604) to the UFS device 502 for a portion of an L2P table. The request in operation 604 can also be referred to as an HPB request. The portion of the L2P table is associated with the region. For example, the portion of the L2P table can include the address mapping information of logic blocks of the region. In some implementations, the request can be an HPB READ BUFFER command. In response to reception of the request, the UFS device 502 (e.g., a memory controller 106 of the UFS device 502) can determine and read (operation 606) the portion of the L2P table corresponding to the region to be activated (e.g., from the memory device 104) and send a response that includes the portion of the L2P table to the host 108 (operation 608). The response in operation 608 can also be referred to as an HPB response. In some implementations, the response can be a "data in UFS Protocol Information Units" (UPIU) command. The host 108 can store (operation 610) the received portion of the L2P table in a host memory (e.g., the host memory 110). In some implementations, the portion of the L2P table can be referred to as an HPB entry or an L2P entry.

Diagram 600*b* shows an HPB region deactivation process. The host 108 (e.g., using the UFS host controller driver 512) can identify an HPB region to deactivate (operation 612) and send a deactivation request (operation 614) to the UFS device 502. In some implementations, the deactivation request is an HPB WRITE BUFFER command. In response to reception of the deactivation request, the UFS device 502 can deactivate the HPB region (operation 616).

Diagram 600*c* shows an HPB read operation. The host 108 can read data in an HPB region (operation 618) by sending a read command (operation 620) to the UFS device 502. In some implementations, the read command for an HPB region can be an HPB READ command. The HPB read command can carry an LBA (e.g., a starting LBA) of the data, an HPB entry corresponding to the LBA, and a TRANSFER LENGTH. Upon receiving the HPB READ command, the UFS device 502 (e.g., the memory controller 106 of the UFS device 502) can determine whether the HPB read command is associated with data in an active HPB region and whether the HPB read command includes an HPB entry (e.g., a portion of an L2P table associated with the active HPB region). In response to determining that the HPB read command is associated with data in an active HPB region and the HPB read command includes an HPB entry, the UFS device 502 can decode the received HPB entry corresponding to the designated LBA to obtain information regarding the physical address or the PBA of the designated LBA. The UFS device 502 can access a memory device (e.g., the memory device 104) according to the physical address to fetch the data (e.g., operation 622). The UFS device 502 can send one or more DATA IN UPIU packets to the host 108 to deliver the data (e.g., operation 624).

Diagram 600*d* shows a non-HPB read operation or a normal read operation. The host 108 can read data in a non-HPB region (operation 626) by sending a normal read command (operation 628) to the UFS device 502. In some implementations, the normal read command can be a read command that does not carry an HPB entry. The normal read command includes an LBA of the data to be read. Upon receiving the normal read command, the UFS device 502 (e.g., the memory controller 106 of the UFS device 502) can determine whether the normal read command is associated with data in an active HPB region and whether the normal read command includes an HPB entry. In response to determining that the normal read command is not associated with data in an active HPB region, or the normal read command does not include an HPB entry, or both, the UFS device 502 can obtain PBAs corresponding to the designated LBA using the L2P table stored in the UFS device 502. The UFS device 502 can access a memory device (e.g., the memory device 104) according to the PBAs to fetch the data (e.g., operation 630). The UFS device 502 can send one or more DATA IN UPIU packets to the host 108 to deliver the data (e.g., operation 632).

The host 108 can identify a new HPB region (e.g., the operation 602 of FIG. 6) using any suitable methods. In some implementations, the host 108 (e.g., using the UFS host controller driver 512) can identify a new HPB region based on information provided by the file system (e.g., the file system 510 of FIG. 5). The file system 510 can be an F2FS. The F2FS can use a log-based writing structure. For example, the F2FS can maintain multiple logs including a hot node log, a warm node log, a cold node log, a hot data log, a warm data log, and a cold data log. In some implementations, data representing a direct node block for a directory may belong to a hot node log. Data stored in a direct node block for regular files may belong to a warm node log. Data stored in an indirect node block may belong to a cold node log. Data stored in a directory entry block may belong to a hot data log. Data stored in a data block made by a user may belong to a warm data log. Data stored in a data block moved by cleaning may belong to a cold data log. The temperature of a log can represent an active level of data stored in a specific region. In other words, if a region contains data in a higher temperature log, data in the region may have a higher active level and may be updated more frequently. For example, data in a first region associated with a hot data log can be updated more frequently than data in a second region associated with a warm data log, and the data in the second region can be updated more frequently than data in a third region associated with a cold data log. The active level associated with a region of the F2FS (e.g., which type of the above described logs the region is associated with) can be used by the host 108 to identify an HPB region.

Figure 7A:
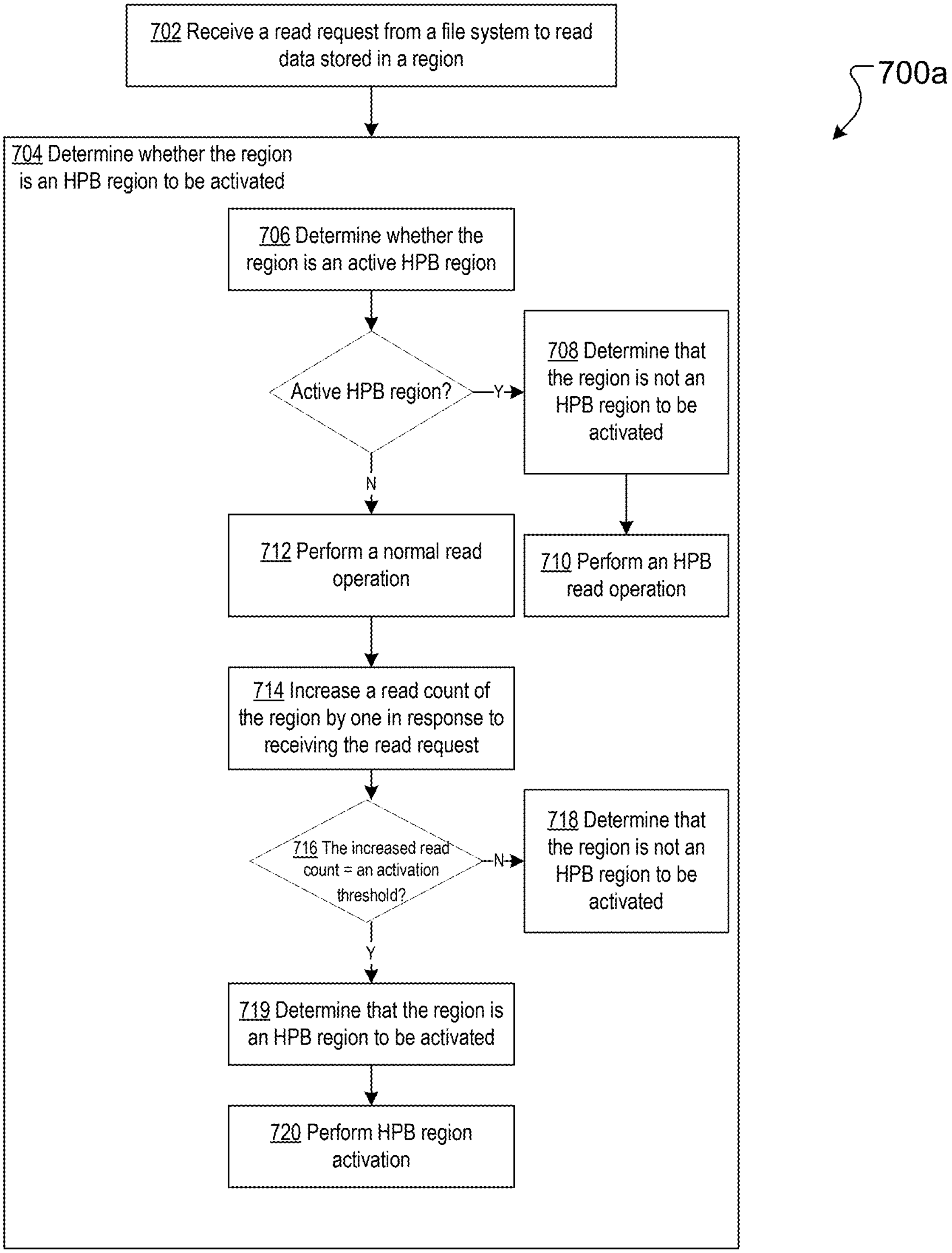
FIG. 7A illustrates a flow chart of an example process of identifying an HPB region to be activated.

FIG. 7A illustrates a flow chart of an example process 700*a* of identifying an HPB region to be activated. The process 700*a* can be performed, for example, by an interface driver (e.g., the UFS host controller driver 512 of FIG. 5) of a host 108. At operation 702, the interface driver can receive a read request from a file system (e.g., the file system 510 of FIG. 5) to read data stored in a region associated with a memory system (e.g., the UFS device 502 of FIG. 5). The read request can include an active level of the region. In some implementations, the active level of the region is determined by the file system. For example, the active level can be represented by a type of a log that the region is associated with. As described above, in some implementations, the type can be one of the following: a hot node log, a warm node log, a cold node log, a hot data log, a warm data log, and a cold data log. In some instances, a region associated with a hot data log has a higher active level than another region associated with a cold data log.

At operation 704, the interface driver can determine whether the region is an HPB region to be activated. In some implementations, the determination can be based on at least the active level of the region. In some implementations, the operation 704 can include operations 706-720.

At operation 706, the interface driver can determine whether the region is an active HPB region. When the region is an active HPB region, the process 700*a* proceeds to operation 708. At the operation 708, the interface driver can determine that the region is not the HPB region to be activated. At operation 710, the interface driver can perform an HPB read operation based on the received read request. For example, the interface driver can send an HPB read command that carries an HPB entry associated with the region to the memory system (e.g., as described with reference to diagram 600*c* of FIG. 6).

When the region is not an active HPB region, the process 700*a* proceeds to operation 712. At operation 712, the interface driver can perform a normal read operation based on the received read request. For example, the interface driver can send a normal read command to the memory system, and the normal read command is absent of an HPB entry associated with the region (e.g., as described with reference to diagram 600*d* of FIG. 6).

At operation 714, the interface driver can increase a read count of the region by one in response to receiving the read request.

At operation 716, the interface driver can compare the increased read count to an activation threshold. When the increased read count is not equal to the activation threshold, the process 700*a* proceeds to operation 718, where the interface driver can determine that the region is not an HPB region to be activated. Otherwise, when the increased read count is equal to the activation threshold, the process 700*a* proceeds to operation 719, where the interface driver can determine that the region is an HPB region to be activated.

At operation 720, the interface driver can perform an HPB region activation process. For example, the interface driver can send an HPB request to the memory system for an HPB entry associated with the region (e.g., as described with reference to diagram 600*a* of FIG. 6). After the HPB region activation process is completed, the interface driver can receive the HPB entry associated with the region, and the region can become an active HPB region.

In some implementations, the activation threshold (e.g., used at operation 716) can be determined based on the active level of the region. In some implementations, the activation threshold is smaller when the active level of the region is higher. For example, the read request from the file system can include a type of a log that the region is associated with. The type of the log can indicate the active level. In some instances, the activation threshold is 4 if the log is a hot node log or a hot data log, the activation threshold is 8 if the log is a warm node log or a warm data log, and the activation threshold is 16 if the log is a cold node log or a cold data log.

In some implementations, the read count of the region can be initialized to value 0 when the host is booted. In some implementations, to improve the HPB region identification accuracy and the read performance, the read count of the region can be initialized periodically.

Figure 7B:
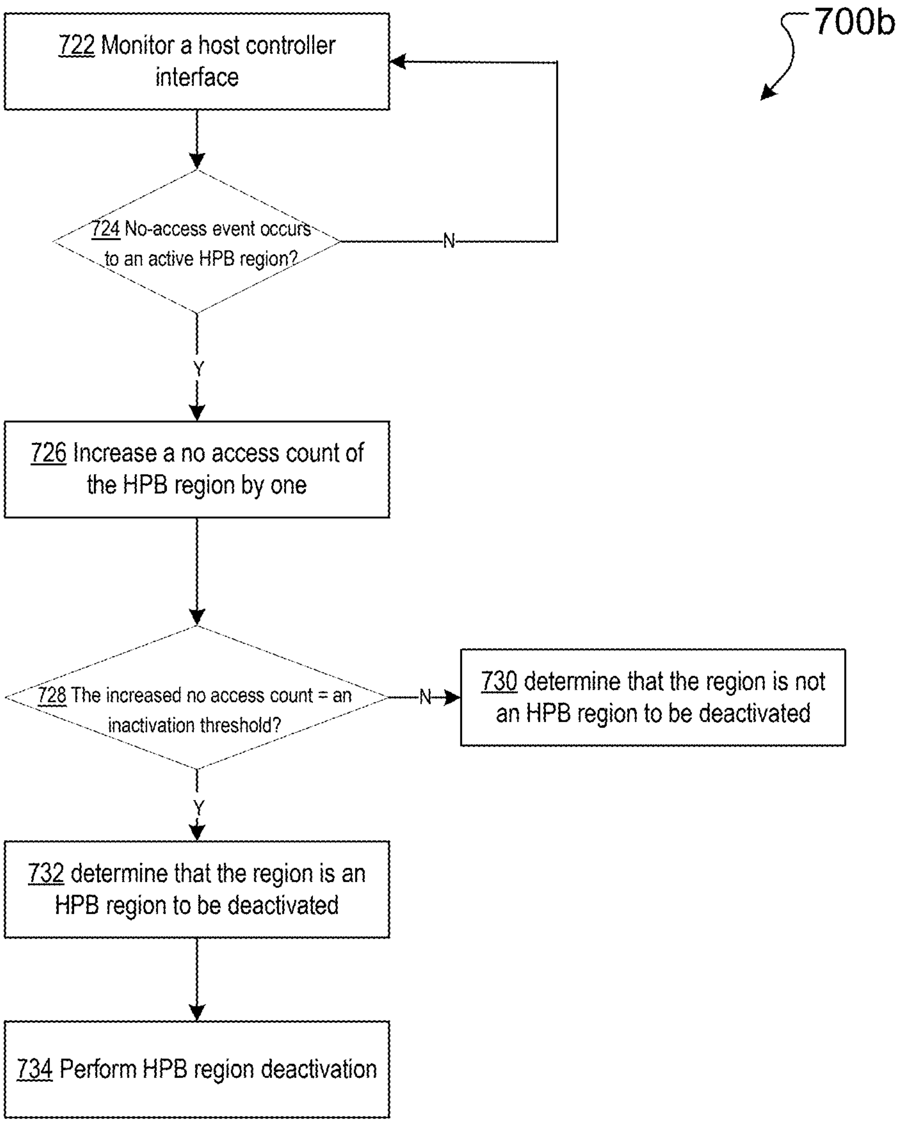
FIG. 7B illustrates a flow chart of an example process of identifying an active HPB region to be deactivated.

FIG. 7B illustrates a flow chart of an example process 700*b* of identifying an active HPB region to be deactivated. The process 700*b* can be performed, for example, by an interface driver (e.g., the UFS host controller driver 512 of FIG. 5) of a host 108. At operation 722, the interface driver can monitor a host controller interface to detect a no-access event of an active HPB region. In some implementations, the interface driver can determine that a no-access event occurs to an active HPB region when the interface driver determines that the host has not accessed the active HPB region within a predetermined time period. At operation 724, the interface driver can determine whether the no-access event occurs to the active HPB region. If the interface driver does not detect a no-access event for the active HPB region, the process 700*b* goes back to operation 722, where the interface driver can keep monitoring. If the interface driver detects a no-access event that occurs to the active HPB region, the process 700*b* proceeds to operation 726.

At operation 726, the interface driver can increase a no-access count of the active HPB region by one.

At operation 728, the interface driver can compare the increased no-access count to an inactivation threshold. When the increased no-access count is not equal to the inactivation threshold, the process 700*b* proceeds to operation 730, where the interface driver can determine that the active HPB region is not an HPB region to be deactivated. Otherwise, when the increased no-access count is equal to the inactivation threshold, the process 700*b* proceeds to operation 732.

At operation 732, the interface driver can determine that the active HPB region is an HPB region to be deactivated.

At operation 734, the interface driver can perform an HPB region deactivation process. For example, the interface driver can send a deactivation request to the memory system (e.g., as described with reference to diagram 600*b* of FIG. 6). After the HPB region deactivation process is completed, the interface driver can determine that the active HPB region becomes an inactive HPB region.

In some implementations, the inactivation threshold (e.g., used at operation 728) can be determined based on the active level of the region. In some implementations, the inactivation threshold is larger when the active level of the region is higher. For example, the read request from the file system can include a type of a log that the region is associated with. The type of the log can indicate the active level. In some instances, the inactivation threshold is 96 if the log is a hot node log or a hot data log, the inactivation threshold is 88 if the log is a warm node log or a warm data log, and the inactivation threshold is 16 if the log is a cold node log or a cold data log.

In some implementations, the no-access count of the region can be initialized to value 0 when the host is booted. In some implementations, to improve the inactive HPB region identification accuracy and the read performance, the no-access count of the region can be initialized periodically.

Figure 8:
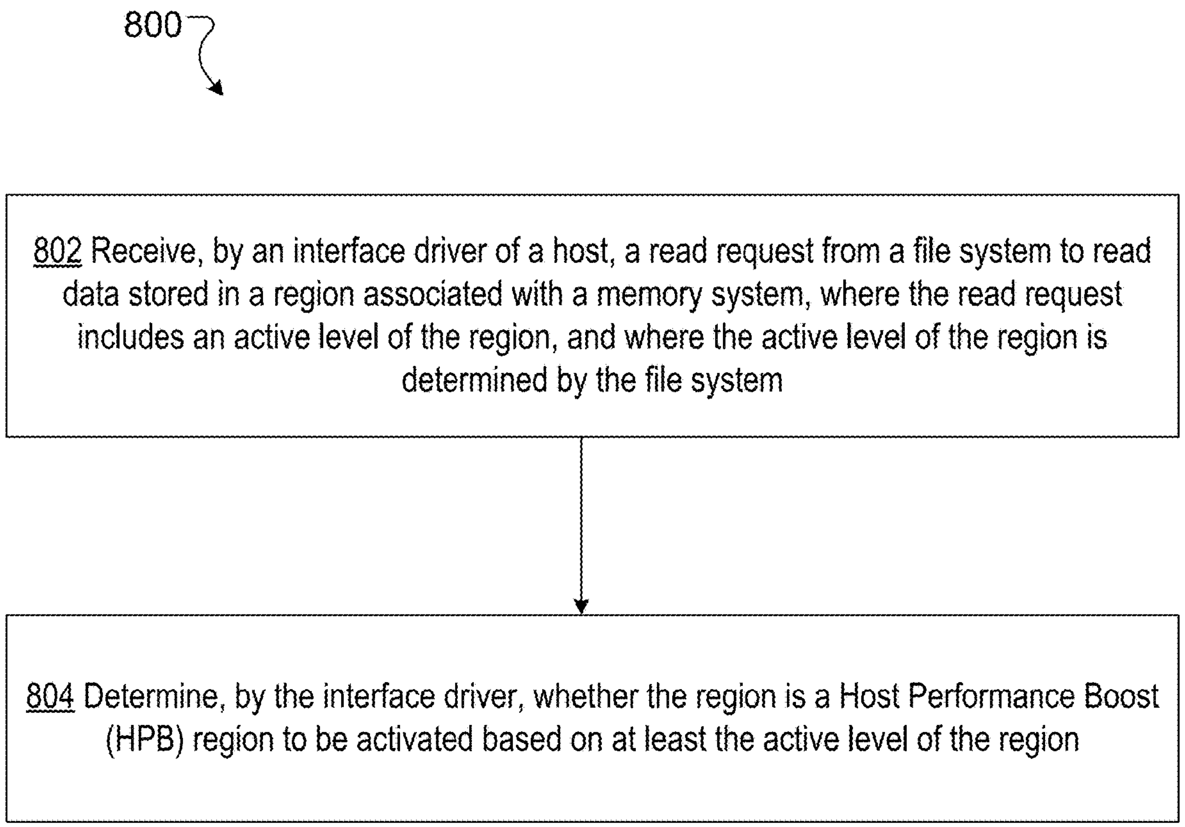
FIG. 8 illustrates an example method for HPB region management.

FIG. 8 illustrates an example method 800 for HPB region management. The method 800 can be performed, for example, by an interface driver (e.g., the UFS host controller driver 512 of FIG. 5) of a host 108. At operation 802, the interface diver of the host can receive a read request from a file system (e.g., the file system 510 of FIG. 5). The read request can include an active level of the region. In some implementations, the active level of the region is determined by the file system.

At operation 804, the interface driver can determine whether the region is an HPB region to be activated based on at least the active level of the region.

In some implementations, determining whether the region is the HPB region to be activated based on at least the active level of the region includes determining that the region is not the HPB region to be activated when the region is an active HPB region (e.g., as described at operation 708 of FIG. 7A).

In some implementations, determining whether the region is the HPB region to be activated based on at least the active level of the region includes determining whether the region is the HPB region to be activated based on a read count of the region and an activation threshold when the region is an inactive HPB region (e.g., as described at operations 712, 714, 716, and 719 of FIG. 7A). The activation threshold is determined based on the active level of the region.

In some implementations, determining whether the region is the HPB region to be activated based on the read count of the region and the activation threshold includes increasing the read count by one (e.g., as described at operation 714 of FIG. 7A) and determining that the region is the HPB region to be activated when the increased read count is equal to the activation threshold (e.g., as described at operations 716 and 719 of FIG. 7A).

Implementations of the subject matter and the actions and operations described in this present disclosure can be implemented in digital electronic circuitry, in tangibly-embodied computer software or firmware, in computer hardware, including the structures disclosed in this present disclosure and their structural equivalents, or in combinations of one or more of them. Implementations of the subject matter described in this present disclosure can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively, or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

It is noted that references in the present disclosure to "one embodiment," "an embodiment," "an example embodiment," "some implementations," "some implementations," etc., indicate that the embodiment described can include a particular feature, structure, or characteristic, but every embodiment can not necessarily include the particular feature, structure, or characteristic. Moreover, such phrases do not necessarily refer to the same embodiment. Further, when a particular feature, structure or characteristic is described in connection with an embodiment, it would be within the knowledge of a person skilled in the pertinent art to affect such feature, structure or characteristic in connection with other implementations whether or not explicitly described.

In general, terminology can be understood at least in part from usage in context. For example, the term "one or more" as used herein, depending at least in part upon context, can be used to describe any feature, structure, or characteristic in a singular sense or can be used to describe combinations of features, structures or characteristics in a plural sense. Similarly, terms, such as "a," "an," or "the," again, can be understood to convey a singular usage or to convey a plural usage, depending at least in part upon context. In addition, the term "based on" can be understood as not necessarily intended to convey an exclusive set of factors and may, instead, allow for existence of additional factors not necessarily expressly described, again, depending at least in part on context.

It should be readily understood that the meaning of "on," "above," and "over" in the present disclosure should be interpreted in the broadest manner such that "on" not only means "directly on" something, but also includes the meaning of "on" something with an intermediate feature or a layer therebetween. Moreover, "above" or "over" not only means "above" or "over" something, but can also include the meaning it is "above" or "over" something with no intermediate feature or layer therebetween (i.e., directly on something).

Further, spatially relative terms, such as "beneath," "below," "lower," "above," "upper," and the like, can be used herein for ease of description to describe one element or feature's relationship to another element(s) or feature(s) as illustrated in the figures. The spatially relative terms are intended to encompass different orientations of the device in use or process step in addition to the orientation depicted in the figures. The apparatus can be otherwise oriented (rotated 90 degrees or at other orientations) and the spatially relative descriptors used herein can likewise be interpreted accordingly.

As used herein, the term "substrate" refers to a material onto which subsequent material layers are added. The substrate includes a "top" surface and a "bottom" surface. The top surface of the substrate is typically where a semiconductor device is formed, and therefore the semiconductor device is formed at a top side of the substrate unless stated otherwise. The bottom surface is opposite to the top surface and therefore a bottom side of the substrate is opposite to the top side of the substrate. The substrate itself can be patterned. Materials added on top of the substrate can be patterned or can remain unpatterned. Furthermore, the substrate can include a wide array of semiconductor materials, such as silicon, germanium, gallium arsenide, indium phosphide, etc. Alternatively, the substrate can be made from an electrically noN+ conductive material, such as a glass, a plastic, or a sapphire wafer.

As used herein, the term "layer" refers to a material portion including a region with a thickness. A layer has a top side and a bottom side where the bottom side of the layer is relatively close to the substrate and the top side is relatively away from the substrate. A layer can extend over the entirety of an underlying or overlying structure, or can have an extent less than the extent of an underlying or overlying structure. Further, a layer can be a region of a homogeneous or inhomogeneous continuous structure that has a thickness less than the thickness of the continuous structure. For example, a layer can be located between any set of horizontal planes between, or at, a top surface and a bottom surface of the continuous structure. A layer can extend horizontally, vertically, and/or along a tapered surface. A substrate can be a layer, can include one or more layers therein, and/or can have one or more layer thereupon, thereabove, and/or therebelow. A layer can include multiple layers. For example, an interconnect layer can include one or more conductive and contact layers (in which contacts, interconnect lines, and/or vertical interconnect accesses (VIAs) are formed) and one or more dielectric layers.

As used herein, the term "nominal/nominally" refers to a desired, or target, value of a characteristic or parameter for a component or a process step, set during the design phase of a product or a process, together with a range of values above and/or below the desired value. As used herein, the range of values can be due to slight variations in manufacturing processes or tolerances. As used herein, the term "about" indicates the value of a given quantity that can vary based on a particular technology node associated with the subject semiconductor device. Based on the particular technology node, the term "about" can indicate a value of a given quantity that varies within, for example, 10-30% of the value (e.g., .+−0.10%, .+−0.20%, or .+−0.30% of the value).

In the present disclosure, the term "horizontal/horizontally/lateral/laterally" means nominally parallel to a lateral surface of a substrate, and the term "vertical" or "vertically" means nominally perpendicular to the lateral surface of a substrate.

As used herein, the term "3D memory" refers to a three-dimensional (3D) semiconductor device with vertically oriented strings of memory cell transistors (referred to herein as "memory strings," such as NAND strings) on a laterally-oriented substrate so that the memory strings extend in the vertical direction with respect to the substrate.

The present disclosure provides many different implementations, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include implementations in which the first and second features may be in direct contact, and may also include implementations in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various implementations and/or configurations discussed.

The foregoing description of the specific implementations can be readily modified and/or adapted for various applications. Therefore, such adaptations and modifications are intended to be within the meaning and range of equivalents of the disclosed implementations, based on the teaching and guidance presented herein.

While the present disclosure contains many specific implementation details, these should not be construed as limitations on the scope of what is being claimed, which is defined by the claims themselves, but rather as descriptions of features that may be specific to particular implementations of particular inventions. Certain features that are described in this present disclosure in the context of separate implementations can also be implemented in combination in a single embodiment. Conversely, various features that are described in the context of a single embodiment can also be implemented in multiple implementations separately or in any suitable sub-combination. Moreover, although features may be described above as acting in certain combinations and even initially be claimed as such, one or more features from a claimed combination can in some cases be excised from the combination, and the claim may be directed to a sub-combination or variation of a sub-combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations also are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The breadth and scope of the present disclosure should not be limited by any of the above-described exemplary implementations, but should be defined only in accordance with the following claims and their equivalents.

What is claimed is:

1. A host, comprising:

an interface coupled to a memory system; and an interface driver configured to perform operations comprising:

receiving a read request from a file system to read data stored in a region associated with the memory system, wherein the read request comprises an active level of the region, wherein the active level of the region indicates a temperature type of the region, and wherein the active level of the region is determined by the file system based on an access frequency of the region; and determining whether the region is a Host Performance Boost (HPB) region to be activated based on at least the active level of the region, wherein:

when the region is an active HPB region, determining that the region is not the HPB region to be activated; or when the region is an inactive HPB region, determining whether the region is the HPB region to be activated based on a read count of the region and an activation threshold, wherein the activation threshold is determined based on the active level of the region.

2. The host of claim 1, wherein the determining whether the region is the HPB region to be activated based on the read count of the region and the activation threshold comprises:

increasing the read count by one in response to receiving the read request; and determining that the region is the HPB region to be activated when the increased read count is equal to the activation threshold.

3. The host of claim 1, wherein the operations further comprise:

in response to determining that the region is the HPB region to be activated, sending an HPB request to the memory system through the interface for a portion of a logical-to-physical (L2P) mapping table, the portion of the L2P mapping table being associated with the region.

4. The host of claim 1, wherein the activation threshold is smaller when the active level of the region is higher.

5. The host of claim 3, wherein the operations further comprise:

receiving an HPB response from the memory system through the interface, wherein the HPB response comprises the portion of the L2P mapping table;

storing the portion of the L2P mapping table in a memory of the host; and determining that the region is an active HPB region.

6. The host of claim 1, wherein the operations further comprise:

in response to receiving the read request, sending a read command to the memory system through the interface, wherein the read command comprises a portion of a logical-to-physical (L2P) mapping table when the region is an active HPB region, the portion of the L2P mapping table being associated with the region.

7. The host of claim 1, wherein the operations further comprise:

in response to receiving the read request, sending a read command to the memory system through the interface, wherein the read command is absent of a portion of a logical-to-physical (L2P) mapping table when region is an inactive HPB region.

8. The host of claim 1, wherein the operations further comprise:

detecting a no-access event of the region; and when the region is an active HPB region:

increasing a no-access count of the region by one; and determining that the region is an inactive HPB region when the increased no-access count is equal to an inactivation threshold.

9. The host of claim 8, wherein the no-access event is generated by the interface driver of the host in response to determining that the region is an active HPB region and that the host has not accessed the region within a predetermined time period.

10. The host of claim 8, wherein the inactivation threshold is larger when the active level of the region is higher.

11. An electrical system, comprising:

a memory system comprising:

a memory controller; and at least one memory device, and a host, comprising:

an interface coupled to the memory system; and an interface driver configured to:

receive a read request from a file system to read data stored in a region associated with the memory system, wherein the read request comprises an active level of the region, wherein the active level of the region indicates a temperature type of the region, and wherein the active level of the region is determined by the file system based on an access frequency of the region; and determine whether the region is a Host Performance Boost (HPB) region to be activated based on at least the active level of the region, wherein:

when the region is an active HPB region, determining that the region is not the HPB region to be activated; or when the region is an inactive HPB region, determining whether the region is the HPB region to be activated based on a read count of the region and an activation threshold, wherein the activation threshold is determined based on the active level of the region.

12. The electrical system of claim 11, wherein the determining whether the region is the HPB region to be activated based on the read count of the region and the activation threshold comprises:

increasing a read count of the region by one;

determining that the region is the HPB region to be activated when the increased read count is equal to the activation threshold.

13. The electrical system of claim 11, wherein the interface driver is further configured to:

in response to determining that the region is the HPB region to be activated, send an HPB request to the memory system through the interface for a portion of a logical-to-physical (L2P) mapping table, the portion of the L2P mapping table being associated with the region.

14. The electrical system of claim 13, wherein the memory controller is configured to:

receive the HPB request from the host;

determine a portion of a logical-to-physical (L2P) mapping table, wherein the portion of the L2P mapping table is associated with the region; and send an HPB response to the host, wherein the HPB response comprises the portion of the L2P mapping table.

15. The electrical system of claim 11, wherein the interface driver is further configured to:

in response to receiving the read request, send a read command to the memory system through the interface, wherein the read command comprises a portion of a logical-to-physical (L2P) mapping table when the region is an active HPB region, the portion of the L2P mapping table being associated with the region.

16. The electrical system of claim 11, wherein the memory controller is configured to:

receive a read command from the host through the interface; and determine whether the read command is associated with data in an active HPB region and whether the read command comprises a portion of a logical-to-physical (L2P) mapping table associated with the active HPB region.

17. A method comprising:

receiving, by an interface driver of a host, a read request from a file system to read data stored in a region associated with a memory system, wherein the read request comprises an active level of the region, wherein the active level of the region indicates a temperature type of the region, and wherein the active level of the region is determined by the file system based on an access frequency of the region; and determining, by the interface driver, whether the region is a Host Performance Boost (HPB) region to be activated based on at least the active level of the region, wherein:

when the region is an active HPB region, determining that the region is not the HPB region to be activated; or when the region is an inactive HPB region, determining whether the region is the HPB region to be activated based on a read count of the region and an activation threshold, wherein the activation threshold is determined based on the active level of the region.

18. The method of claim 17, wherein the determining whether the region is the HPB region to be activated based on the read count of the region and the activation threshold comprises: increasing the read count by one; and determining that the region is the HPB region to be activated when the increased read count is equal to the activation threshold.

19. The method of claim 17, further comprising:

in response to determining that the region is the HPB region to be activated, sending an HPB request to the memory system through the interface for a portion of a logical-to-physical (L2P) mapping table, the portion of the L2P mapping table being associated with the region.

20. The method of claim 17, wherein the activation threshold is smaller when the active level of the region is higher.

* * * * *